United States Patent [19]
Lenaers et al.

[11] 3,716,542
[45] Feb. 13, 1973

[54] PROCESS FOR THE PREPARATION OF ISOCARBOSTYRILS

[75] Inventors: Rene Lenaers, Brussels; Ernest H. de Ruiter, Beersel; Jan J. Vandewalle, Mortsel, all of Belgium

[73] Assignee: Union Carbide Corporation, New York, N.Y.

[22] Filed: Dec. 23, 1970

[21] Appl. No.: 101,146

[52] U.S. Cl. ........260/289 R, 260/283 R, 260/283 S, 260/286 R
[51] Int. Cl. ............................................C07d 35/30
[58] Field of Search ......260/289 R, 326.5 FM, 239.3

*Primary Examiner*—Donald G. Daus.
*Attorney*—Paul A. Rose, Harrie M. Humphreys and William R. Moran

[57] ABSTRACT

Isocarbostyrils are conveniently prepared in high yields and in a high degree of purity by contacting an isoquinoline with an anhydrous, liquid melt mixture of potassium hydroxide and sodium hydroxide.

The anhydrous, melt mixture is prepared by reacting potassium hydroxide with an amount of sodium oxide sufficient to consume all the water present and then heating the mixture to its melting point. Thereafter the isoquinoline is added and upon completion of the reaction, water is introduced to hydrolyze the potassium isocarbostyril salt. Isocarbostyrils are useful as intermediates in the production of dyes, pharmaceuticals, antioxidants, and surfactants.

10 Claims, No Drawings

PROCESS FOR THE PREPARATION OF ISOCARBOSTYRILS

This invention relates to a process for the preparation of isocarbostyrils. In one aspect, this invention is directed to the preparation of isocarbostyrils in high yields and in a high degree of purity. In a further aspect, this invention is directed to the preparation of isocarbostyrils which are useful intermediates in the synthesis of known organic compounds.

Various methods have been reported in the literature for the production of isocarbostyrils. One of the earliest methods reported was the work of A. E. Chichibabin et al., Journ. Pricladnoi Fiziceskogo Chimiceskogo Obchestva, tome LXII, vol. 5, 1211/6 ( 1930 ) which used solid potassium hydroxide and isoquinoline to produce isocarbostyril. The reaction, however, was irregular and the product had to be purified. Moreover, the preparation of powdered "calcinated" potassium hydroxide required special facilities. More recently, other methods have been devised for the preparation of isocarbostyrils. For example, M.M. Robison et al, J. Org. Chem. 21, 1337 ( 1957 ), reported the preparation of isocarbostyril by a two-step synthesis involving the preparation of the N-oxide of isoquinoline. The method involved the use of large amounts of solvents and had an overall yield of 30–35 percent.

In 1962, V. Georgian et al reported in J. Org. Chem. 27, 4571 (1962) a process for hydrolyzing isoquinoline-5-sulfonic acid into 5-hydroxy isoquinoline using a mixture of potassium hydroxide and sodium hydroxide. The process was applied only to isoquinoline-5-sulfonic acid and not to other derivatives, including isoquinoline itself. It has since been observed that the process cannot be applied successfully to isoquinoline itself or most other derivatives unless the alkali melt is free of water. This involves heating the mixture at least to 475°–500°C. before introducing the isoquinoline. It thus appeared that the reaction with isoquinoline sulfonic acid was unique and did not require the removal of moisture. Recent attempts, however, to prepare isocarbostyrils using technical or analytical grade potassium hydroxide which is not moisture-free have been largely unsuccessful. The preparation of large amounts of moisture-free potassium hydroxide has rendered the earlier processes unsuitable when large scale quantities of isocarbostyrils are desired.

It is therefore an object of this invention to provide a process for the preparation of isocarbostyrils. Another object of this invention is to provide a process for the preparation of isocarbostyrils in high yields and in a high degree of purity. A further object of the invention is to provide a process which can be conducted in a continuous manner. A still further object of the invention is to provide a product which is sufficiently pure to be used without additional purification. A further object of the invention is to provide a process which can be conducted at relatively low temperatures. These and other objects will readily become apparent to those skilled in the art in the light of the teachings herein set forth.

In its broad aspect, the invention is directed to a novel process for the preparation of isocarbostyrils. In particular, the preferred isocarbostyrils which can be prepared by the instant process are those represented by the formula:

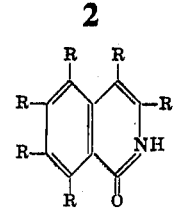

wherein R represents hydrogen, hydroxy or lower alkyl. Also two adjacent R groups can together with the carbon atoms to which they are attached form a six-membered hydrocarbon ring. The process comprises the steps of:

a. contacting in an inert atmosphere :
  i. an anhydrous liquid melt mixture comprised of potassium hydroxide and sodium hydroxide, said melt having been prepared by reacting potassium hydroxide with an amount of sodium oxide at least sufficient to consume essentially all the water present in the potassium hydroxide, and then heating the reaction product of the potassium hydroxide and sodium oxide to its melting point, and
  ii. an isoquinoline of the formula:

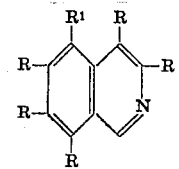

wherein R is as above, and $R^1$ represents hydrogen, lower alkyl or the sulfonic acid group, b. hydrolyzing the isocarbostyril salt thus formed, and c. recovering the isocarbostyril in a high yield and in a high degree of purity.

The process of this invention provides a convenient method for the preparation of isocarbostyrils in high yields and in a high degree of purity. In contrast to the known prior art methods, the mixture of potassium hydroxide and sodium hydroxide is formed in situ by the addition of sodium oxide to potassium hydroxide. This technique serves the dual purpose of removing essentially all of the water contained in the potassium hydroxide and proving sodium hydroxide as a result of the interaction of sodium oxide and water. A major advantage of this process is that the necessity for drying a mixture of potassium hydroxide and sodium hydroxide is eliminated. It has been observed that if a mixture of potassium and sodium hydroxide is used initially it must be calcinated at relatively high temperatures, i.e., about 500°C. for at least one-quarter of an hour to insure removal of the last traces of water. If the water is not completely removed, the yield of isocarbostyril falls off sharply. For example, it has been observed that when a eutectic melt of potassium and sodium hydroxide is first calcinated at 475°C. for about 15 minutes, then a yield of isocarbostyril as high as 95 percent can be obtained. However, if the mixture is merely heated to about 240°C. and the isoquinoline added, no isocarbostyril is recovered. Hence, the present process, avoids the necessity for heating the mixture to high temperature since removal of water and the generation of sodium hydroxide are effected simultaneously.

In practice, the amount of sodium oxide employed in preparing the anhydrous melt mixture need only be that amount which is sufficient to react with all the water contained in the potassium hydroxide. As indicated, the sodium oxide reacts with the water forming sufficient sodium hydroxide to render the mixture liquid at temperatures of from about 200° to about 250°C.

For example, 120 grams ( 1.9 mole ) of a technical grade potassium hydroxide containing 15 per cent of water ( 18 grams, 1 mole ) was treated with 62 grams ( 2 moles ) of sodium oxide giving 80 grams ( 2 moles ) of sodium hydroxide. This mixture which contained about 50 mole percent of potassium hydroxide and sodium hydroxide melted at about 200° to about 210°C. It has been observed that mixtures containing between about 20 and about 55 mole percent of potassium hydroxide become liquid at relatively low temperature and hence, are suitable for use in the process of this invention. No noticeable adverse effects were observed when an excess of sodium oxide was employed.

In general, after the mixture becomes liquid and reaches a temperature within the range of from about 200° to about 250°C., the isoquinoline is gradually added while the mixture is stirred. The reaction is usually completed when the evolution of hydrogen ceases. Thereafter the mixture is cooled to about 200°C. and water carefully added dropwise to the reaction vessel until the material is pastelike. Thereafter the material is poured into ice water and the insoluble isocarbostyril filtered, washed with 0.5N HCl and water, and dried.

In practice, the reaction is conducted in an inert atmosphere, such as nitrogen, argon or the like.

Isocarbostyrils prepared by the process of this invention have been found to be highly pure and are obtained in relatively high yields. For example, if the starting isoquinoline is relatively pure, the isocarbostyril is obtained in about the same degree of purity. Moreover, yields as high as 83 percent and higher of isocarbostyril have been obtained by the process of this invention.

A wide variety of isocarbostyrils can be prepared by the process of this invention. In addition to isocarbostyril itself, illustrative compounds which can be prepared include, among others, 3-methylisocarbostyril, 3-ethylisocarbostyril, 3-propylisocarbostyril, 3-butylisocarbostyril, 7-methylisocarbostyril, 7-ethylisocarbostyril, 7-propylisocarbostyril, 8-methylisocarbostyril, 8-propylisocarbostyril, 8-butylisocarbostyril, 3,7-dimethylisocarbostyril, 5,7dimethylisocarbostyril, 5-hydroxyisocarbostyril, 7-hydroxyisocarbostyril, and the like.

As previously indicated, the starting material, in most instances, is the corresponding isoquinoline. For example, isoquinoline itself is used to prepare isocarbostyril. The other compounds listed above are prepared respectively from 3-methylisoquinoline, 3-ethylisoquinoline, 3-propylisoquinoline, 3-butylisoquinoline, 7-methylisoquinoline, 7-ethylisoquinoline, 7-propylisoquinoline, 8-methylisoquinoline, 8-propylisoquinoline, 8-butylisoquinoline, 3,7-dimethylisoquinoline, 5,7-dimethylisoquinoline, 5-isoquinoline sulfonic acid, 7-isoquinoline sulfonic acid, and the like.

The isocarbostyrils prepared by the process of this invention are a useful class of compounds having utility in a wide variety of fields. For example, it is known that isocarbostyrils are useful as intermediates in such areas as the production of dyes, pharmaceuticals, antioxidants, surfactants and the like.

The following examples are illustrative

EXAMPLE 1

Preparation of isocarbostyril

A mixture of 336 grams of technical grade KOH and 186 grams of $Na_2O$ was introduced into a steel reaction vessel which was heated with an oil bath. The mixture was then heated up to 220°–230°C., carefully stirred, and 582 grams of isoquinoline where then introduced. The evolution of hydrogen was immediate and was terminated after a few minutes. When the reaction was finished, the oil bath was cooled up to about 200°C. and then water was carefully added and the hot alkaline solution was poured out on ice water where the potassium salt of isocarbostyril hydrolyzed. The mixture was slightly acidified with HCl and the isocarbostyril was filtered, washed with water and dried. The yield of isocarbostyril was 83 percent and the product had a melting point of 210°C. Analysis confirmed the identify of the product.

EXAMPLE 2

Preparation of 3-methylisocarbostyril

In a manner similar to that employed in Example 1 above, a mixture of 448 grams of KOH and 248 grams of $Na_2O$ was introduced into the reaction vessel and heated to 220°–230°C. While carefully stirring the melted mixture 858 grams of 3-methylisoquinoline were added. When the reaction was completed, the oil bath was cooled to about 200°C. and water added. After pouring the hot alkali solution on ice water, acidifying, and filtering as in Example 1 above, the 3-methylisocarbostyril was washed with water and dried. The product had a melting point of 214°C. and was recovered in a yield of 76 percent.

EXAMPLE 3

Preparation of 5-hydroxyisocarbostyril

In a manner similar to that employed in the previous examples, a mixture of 112 grams of KOH and 77 grams of $Na_2O$ was added to the reaction vessel and heated to 220°–230°C. While stirring, 98 grams of 5-isoquinoline sulfonic acid were added. Upon completion of the reaction the oil bath was cooled to about 200°C. and water added. The hot alkali solution was poured on ice water, acidified and filtered as in the previous examples. After washing and drying 5-hydroxyisocarbostyril having a melting point of 266°C. was recovered in a yield of 66 percent.

EXAMPLE 4

Preparation of isocarbostyril from a mixture of potassium hydroxide and sodium hydroxide Nine hundred twenty-five grams of potassium hydroxide and 375 grams of sodium hydroxide were calcinated at 475°C. for 15 minutes in a 5-liter stainless steel reaction vessel under an atmosphere of nitrogen. The alkali melt was then cooled to 240°C. and held at this temperature by an oil bath. While stirring vigorously, 1,500 grams of isoquinoline were slowly added over a period of 2 hours and 35 minutes. The oil bath was then allowed to cool. When its temperature reached 200°C. water was introduced dropwise into the reaction vessel. The water was absorbed by the alkali melt and decreased its solidification temperature. Altogether 2,000 milliliters of water were added over a period of one hour, at which time the temperature of the oil bath was 80°C. The reaction vessel was then opened and the contents, a pastlike material, was poured into 10 liters of water. The insoluble isocarbostyril was filtered, washed with 0.5N HCl and water and dried. There was obtained 1,640 grams of isocarbostyril having a melting point of 208°–209°C. Analysis of the product confirmed it to be isocarbostyril.

When the calcination at 475°C. to remove water was omitted and the mixture merely heated to 240°C., no isocarbostyril was recovered.

Although the invention has been illustrated by the preceding examples it is not to be construed as being limited to the materials employed therein, but rather, the invention encompasses to the generic area as hereinbefore disclosed. Various modifications of this invention can be made without departing from the spirit and scope thereof.

What is claimed is:

1. A process for the preparation of isocarbostyrils of the formula:

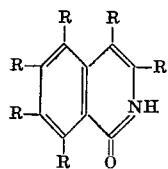

wherein R represents a member selected from the group consisting of hydrogen, or not more than 2 R groups represent hydroxy and lower alkyl of up to four carbon atoms, and wherein two adjacent R groups can, together with the carbon atoms to which they are attached, form a six-membered hydrocarbon ring, said process consisting essentially of the steps of:
   a. contacting, in an inert atmosphere:
      i. an anhydrous liquid melt mixture comprised of potassium hydroxide and sodium hydroxide, said melt having been prepared by reacting potassium hydroxide with an amount of sodium oxide at least sufficient to consume essentially all the water present in said potassium hydroxide, and then heating said potassium hydroxide and sodium oxide mixture to its melting point, and
      ii. an isoquinoline of the formula:

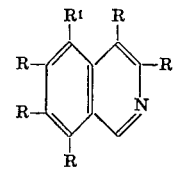

wherein R is as above, and $R^1$ represents a member selected from the group consisting of hydrogen, lower alkyl of up to four carbon atoms or the sulfonic acid group
   b. hydrolyzing the isocarbostyril salt thus formed, and
   c. recovering said isocarbostyril in a high degree of purity.

2. The process of claim 1 wherein said inert atmosphere is nitrogen.

3. The process of claim 1 wherein said liquid melt mixture is at a temperature of from about 200° to about 250°C.

4. The process of claim 1 wherein said liquid melt mixture is comprised of from about 20 to about 55 mole percent of potassium hydroxide.

5. The process of claim 1 wherein said liquid melt mixture is comprised of about 50 mole percent of potassium hydroxide and sodium hydroxide.

6. The process of claim 1 wherein said liquid melt mixture is a eutectic mixture of potassium hydroxide and sodium hydroxide.

7. The process of claim 1 wherein an excess of sodium oxide is present in said melt.

8. The process of claim 1 wherein said potassium hydroxide and sodium oxide mixture has a melting point of from about 200° to about 250°C.

9. The process of claim 1 wherein each of said R groups represents hydrogen.

10. In a process for the preparation of isocarbostyrils by contacting isoquinolines with a liquid melt mixture of potassium hydroxide and sodium hydroxide, the improvement which consisting essentially of preparing said melt by reacting potassium hydroxide with an amount of sodium oxide at least sufficient to consume all the water present in said potassium hydroxide, and then heating said potassium hydroxide and sodium oxide mixture to its melting point.

* * * * *